US011956625B2

(12) United States Patent
Ejiri et al.

(10) Patent No.: US 11,956,625 B2
(45) Date of Patent: *Apr. 9, 2024

(54) UTILIZATION CONTROL SYSTEM AND UTILIZATION CONTROL METHOD

(71) Applicant: BITKEY INC., Tokyo (JP)

(72) Inventors: Yuki Ejiri, Tokyo (JP); Hiroshi Yamamoto, Tokyo (JP)

(73) Assignee: BITKEY INC., Tokyo (JP)

( * ) Notice: Subject to any disclaimer, the term of this patent is extended or adjusted under 35 U.S.C. 154(b) by 338 days.

This patent is subject to a terminal disclaimer.

(21) Appl. No.: 17/433,434

(22) PCT Filed: Jan. 8, 2020

(86) PCT No.: PCT/JP2020/000356
§ 371 (c)(1),
(2) Date: Aug. 24, 2021

(87) PCT Pub. No.: WO2020/174882
PCT Pub. Date: Sep. 3, 2020

(65) Prior Publication Data
US 2022/0167154 A1    May 26, 2022

(30) Foreign Application Priority Data

Feb. 26, 2019    (JP) .................................. 2019-032565

(51) Int. Cl.
*H04W 12/033* (2021.01)
*H04L 9/14* (2006.01)
*H04W 12/06* (2021.01)

(52) U.S. Cl.
CPC ............. *H04W 12/033* (2021.01); *H04L 9/14* (2013.01); *H04W 12/06* (2013.01)

(58) Field of Classification Search
CPC ........ H04W 12/033; H04W 12/06; H04L 9/14
See application file for complete search history.

(56) References Cited

U.S. PATENT DOCUMENTS

| 7,315,823 B2 * | 1/2008 | Brondrup ........... G07C 9/00904 |
| | | 705/5 |
| 10,540,835 B2 * | 1/2020 | Kuenzi .................... G07C 9/29 |

(Continued)

FOREIGN PATENT DOCUMENTS

| JP | 11-316818 | 11/1999 |
| JP | 2003-132435 | 5/2003 |

(Continued)

OTHER PUBLICATIONS

International Search Report for PCT/JP2020/000356, dated Mar. 17, 2020, 7 pages.

(Continued)

*Primary Examiner* — Yonas A Bayou
(74) *Attorney, Agent, or Firm* — Nixon & Vanderhye P.C.

(57) ABSTRACT

The present invention reduces security risks while improving convenience in a utilization control technique of a usage target object. A utilization control device (1) can communicate only via Near Field Communication, and is separated from a network. And in the utilization control device (1), a hole data including a public key is set. In a use permit notification device (2), a use permit and signature are registered for each user ID. The signature is generated by using a private key paired with the public key included in the hole data. The use permit notification device (2) sends the use permit and signature in connection with the ID read from an ID card (3) to the utilization control device (1) via the Near Field Communication. The utilization control device (1) verifies the signature received together with the use permit by using the public key included in the hole data, obtains and refers to the transaction information included in the use permit when the verification is successful, and unlocks an entrance (50) of the house (5) if the conditions specified by the transaction information are satisfied.

7 Claims, 6 Drawing Sheets

(56) References Cited

U.S. PATENT DOCUMENTS

| | | | |
|---|---|---|---|
| 10,818,119 B2* | 10/2020 | Robertson | G07C 9/28 |
| 10,893,055 B2* | 1/2021 | Allen | H04W 4/029 |
| 10,991,240 B2* | 4/2021 | Davis | G06F 1/3287 |
| 11,017,623 B2* | 5/2021 | Kuenzi | G07C 9/27 |
| 11,049,341 B2* | 6/2021 | Klink | H04W 12/02 |
| 11,164,413 B2* | 11/2021 | Kuenzi | G07C 9/00904 |
| 11,367,343 B2* | 6/2022 | Davis | H04W 12/082 |
| 11,704,955 B2* | 7/2023 | Robertson | H04W 12/64 |
| | | | 340/5.61 |
| 2004/0003257 A1 | 1/2004 | Mitchell | |
| 2013/0247142 A1* | 9/2013 | Nishizawa | H04L 63/0815 |
| | | | 726/1 |
| 2016/0036814 A1* | 2/2016 | Conrad | H04L 9/0891 |
| | | | 713/171 |
| 2017/0337755 A1* | 11/2017 | Biehl | H04W 12/108 |

FOREIGN PATENT DOCUMENTS

| | | |
|---|---|---|
| JP | 2007-70832 | 3/2007 |
| JP | 2007070832 A * | 3/2007 |
| JP | 2016-40648 | 3/2016 |
| JP | 2016-079645 | 5/2016 |
| JP | 2016-184875 | 10/2016 |
| JP | 2017-210862 | 11/2017 |
| JP | 2018-035515 | 3/2018 |

OTHER PUBLICATIONS

Written Opinion of the ISA for PCT/JP2020/000356, dated Mar. 27, 2020, 4 pages.

* cited by examiner

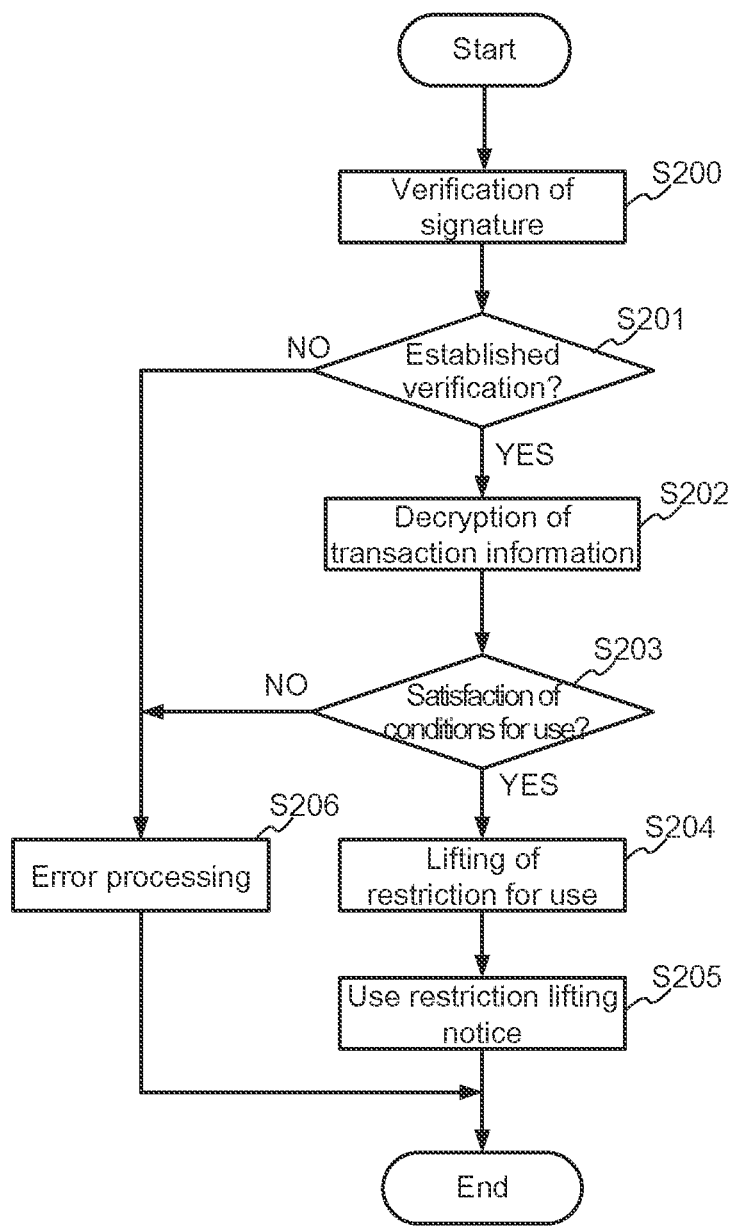

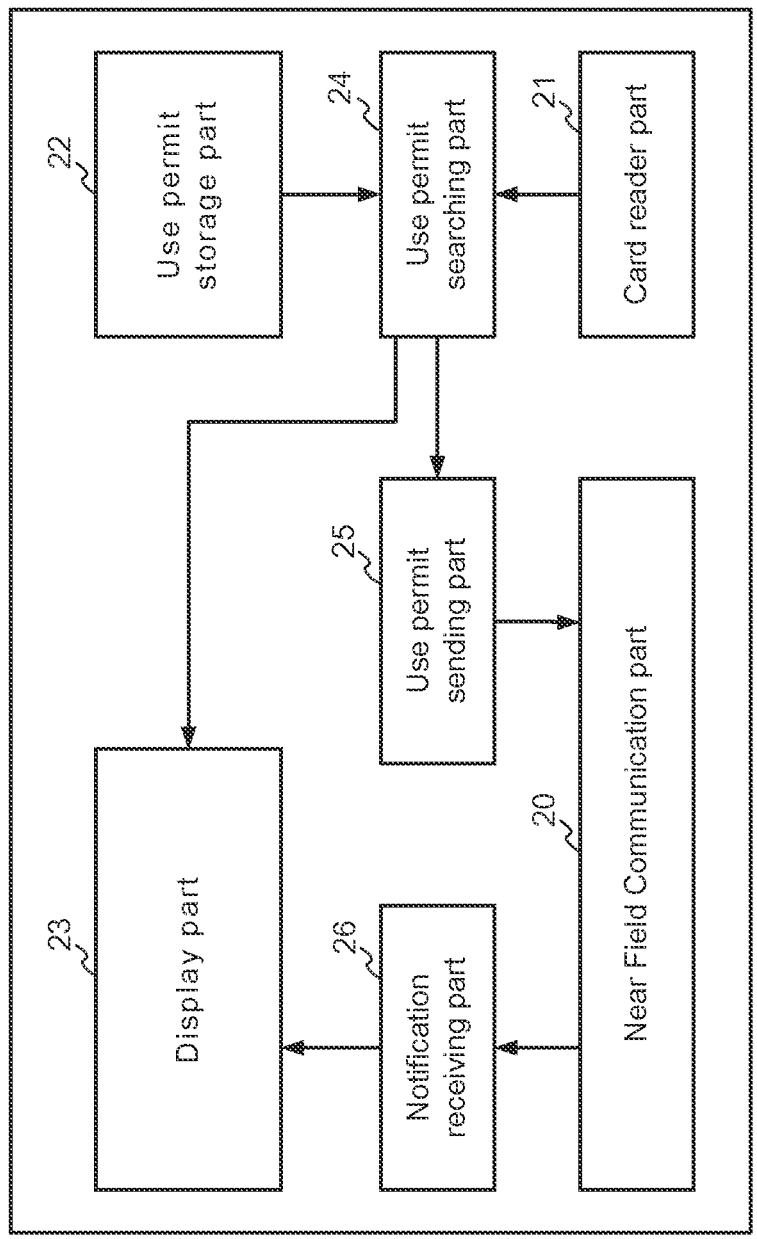

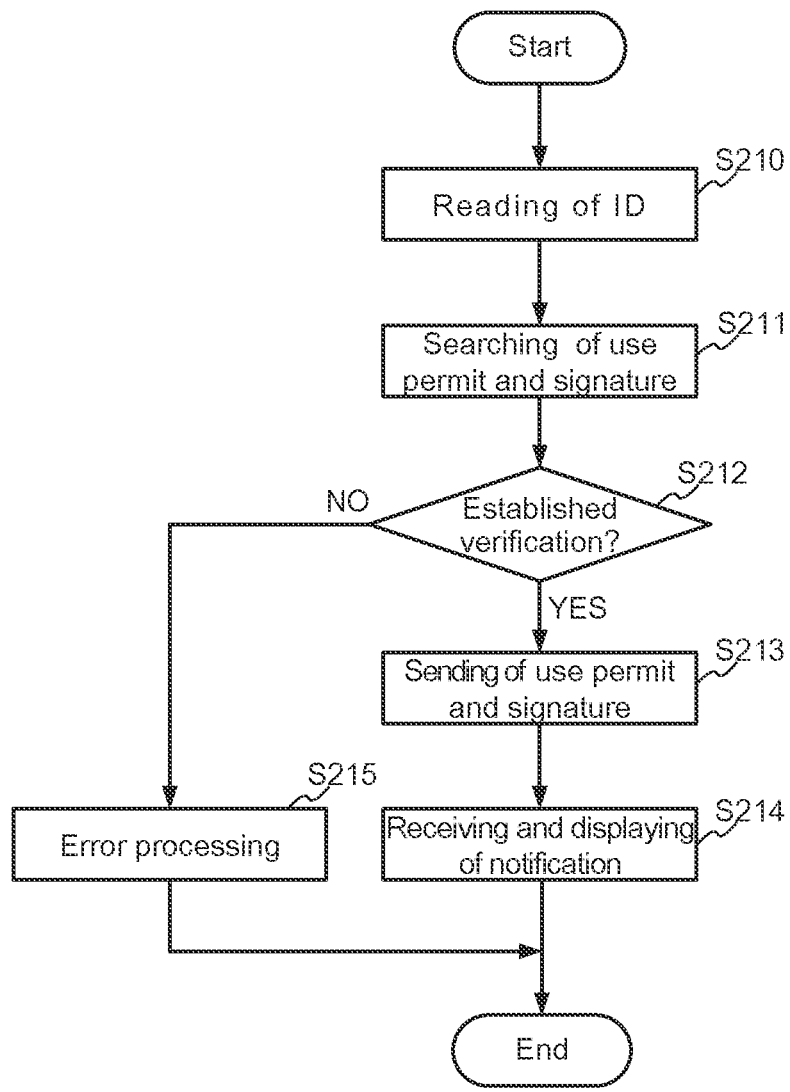

UTILIZATION CONTROL SYSTEM AND UTILIZATION CONTROL METHOD

This application is the U.S. national phase of International Application No. PCT/JP2020/000356 filed 8 Jan. 2020, which designated the U.S. and claims priority to JP Patent Application No. 2019-032565 filed 26 Feb. 2019, the entire contents of each of which are hereby incorporated by reference.

TECHNICAL FIELD

The present invention relates to a utilization control technique of a usage target object whose use can be limited by locking/unlocking, access control, or encrypting/decrypting. As such a usage target object, it is possible to mention an entrance of a hotel, an inn, a guesthouse, a house, a warehouse, or a room, a moving body such as an automobile or a bicycle, and a browsing terminal for an electronic medium containing an electronic medical record or an electronic book, for example.

Background Art

The Patent Literature 1 discloses a system in which, by carrying a room key only, a user can use various services, including locking and unlocking of a room, in a facility such as a corporate facility, a hospital, a game hall, or a public facility. This system comprises: a room key having a Radio Frequency Identification (RFID) tag that can store information such as a room number, a password, customer information, and the like and is readable and writable; RFID readers, which are installed at various places of the facility for reading and writing information from and into the RFID tag of the room key; a database, which stores information on each room and each equipment in the facility; and a server, which is connected to the RFID readers and the database via a network and performs management of the each room and the each equipment in the facility. For example, an RFID reader installed at a door or in a room in the facility reads information stored in an RFID tag of a room key and sends the information to the server. Receiving the information, the server compares the room number contained in the information received from the RFID reader with the room number of the room in which the RFID reader is installed, to lock or unlock the room.

CITATION LIST

Patent Literature

Patent Literature 1: Japanese Unexamined Patent Application Laid-Open No. 2003-132435

SUMMARY OF INVENTION

Technical Problem

The system of the Patent Literature 1, however, premises that a room key is lent out and returned at a reception desk of a facility such as a corporate facility, a hospital, a game hall, or a public facility. Namely, when a user use the facility, the user must stop at the reception desk in order to borrow the room key. And after using the facility, the user must stop at the reception desk in order to return the room key. Accordingly, a geographical distance between the facility and the reception desk causes inconvenience to the user.

Further, the system of the Patent Literature 1 does not assume a case where multiple users use the facility. In this case, a representative will be selected, among the multiple users who use the facility, to be entrusted with the management of the room key and the unlocking/locking of the facility. Therefore, the responsibility of the representative becomes large. On the other hand, the users other than the representative cannot freely unlock/lock the facility. This causes inconvenience to the users other than the representative.

Further, in the system of the Patent Literature 1, the RFID readers installed at various places of the facility read information stored in the RFID tag of a room key, and send the information to the server via the network. Accordingly, in the case where the server is placed outside the facility and the RFID readers installed at various places inside the facility are connected to the server placed outside the facility via the Internet, read information is transmitted over the Internet each time when the RFID reader reads information from the RFID tag of a room key. This therefore increases the security risk.

The present invention has been made taking the above situation into consideration. An object of the invention is to reduce security risks while improving convenience in a utilization control technique of a usage target object whose use can be restricted by locking/unlocking, access control, or encrypting/decrypting, the usage target object including an entrance of a hotel, an inn, a guesthouse, a house, a warehouse, or a room, a moving body such as an automobile or a bicycle, and a browsing terminal for an electronic medium containing an electronic medical record or an electronic book, for example.

Solution to Problem

To solve the above problems, the present invention provides: a utilization control device that controls use of the usage target object by locking/unlocking, access control or encrypting/decrypting based on a use permit including transaction information specifying usage conditions for using the usage target object; and a use permit notification device that notifies the use permit to the utilization control device.

Here, the utilization control device can communicate only via Near Field Communication, and is separated from a network. Further, in the utilization control device, a hole data including a public key required for verification of the use permit is set. On the other hand, in the use permit notification device, the use permit and a signature are registered for each user in association with user identification information such as a password or biometric authentication information. The signature is generated using a private key paired with the public key included in the hole data set in the utilization control device.

When the use permit notification device obtains the user identification information, the use permit notification device sends the use permit and the signature, which are in association with the user identification information, to the utilization control device via the Near Field Communication. Receiving this, the utilization control device verifies the signature received together with the use permit by using the public key included in the hole data. And the utilization control device obtains transaction information included in the use permit when the signature verification is established. Then, the utilization control device refers to the obtained transaction information, and lifts restriction on use of the usage target object when the usage conditions specified by the transaction information are satisfied.

The transaction information included in the use permit may be encrypted by using a common key included in the hole data, which is set to the utilization control device. The utilization control device uses the common key to decrypt the encrypted transaction information included in the use permit received from the use permit notification device.

For example, the present invention provides a utilization control system that controls use of a usage target object, comprising:

a utilization control device that controls use of the usage target object by locking/unlocking, access control, or encrypting/decrypting, based on a use permit including transaction information specifying usage conditions for using the usage target object; and a use permit notification device that notifies the use permit to the utilization control device, wherein, the use permit notification device comprises:

a use permit storage means that stores the use permit together with a signature on the use permit generated by using a predetermined private key, for each user identification information;

an identification information obtaining means that obtains the user identification information; and a use permit sending means that sends the use permit and the signature that are stored in the use permit storage means in association with the user identification information obtained by the identification information obtaining means, to the utilization control device via Near Field Communication, the utilization control device can communicate only via the Near Field Communication, and comprises:

a hole data storage means that stores a hole data that includes a public key paired with the predetermined private key and is necessary for verification of the use permit;

a transaction information obtaining means that verifies the signature received together with the use permit from the use permit notification device by using the public key included in the hole data stored in the hole data storage means to obtain the transaction information included in the use permit when the verification being established; and a lifting means that lifts restriction on use of the usage target object with referring to the transaction information obtained by the transaction information obtaining means when the usage conditions specified by the transaction information being satisfied.

Advantageous Effects of Invention

In the present invention, the utilization control device can communicate only via the Near Field Communication, and is separated from a network. Accordingly, the utilization control device is not attacked from the outside via a network such as the Internet. Further, the user permit used for lifting the restriction on use of the usage target object is validated by verifying the signature added to the use permit, by using the public key included in the hole data. Thus, the present invention can reduce security risks.

Further, according to the present invention, the utilization control device lifts the restriction on use of the usage target object only when the usage conditions specified by the transaction information included in the use permit are satisfied. When the usage conditions are not satisfied, the utilization control device does not lift the restriction on use of the usage target object. Accordingly, by making the transaction information include usage conditions such as a time limit for use, the number of times of use, and the like, the use permit that does not satisfy these usage conditions becomes invalid even though it has been authenticated. As a result, it is not necessary for a user to return the user permit. Further, by registering the use permit of the user in association with the user identification information of the user in the utilization control device in advance, the user can use the usage target object under the usage conditions specified by the transaction information included in the use permit by making the use permit notification device read the user identification information of the user. Accordingly, in the case that multiple users use the usage target object, each user can freely use the facility, or the like, under the usage conditions specified by the transaction information included in own use permit. It is not necessary for selecting a representative among the multiple users to entrust with the management of the room key and the unlocking/locking of the facility. Thus, according to the present invention, convenience is improved.

Thus, according to the present invention, it is possible to improve convenience while reducing security risks in utilization control technique that can restrict using of a usage target object by locking/unlocking/access control/or encrypting/decrypting.

BRIEF DESCRIPTION OF DRAWINGS

FIG. 4 is a flowchart for explaining operation of the utilization control device 1;

FIG. 5 is a schematic functional configuration diagram of a use permit notification device 2; and FIG. 6 is a flowchart for explaining operation of the use permit notification device 2.

DESCRIPTION OF EMBODIMENTS

Figure 1:
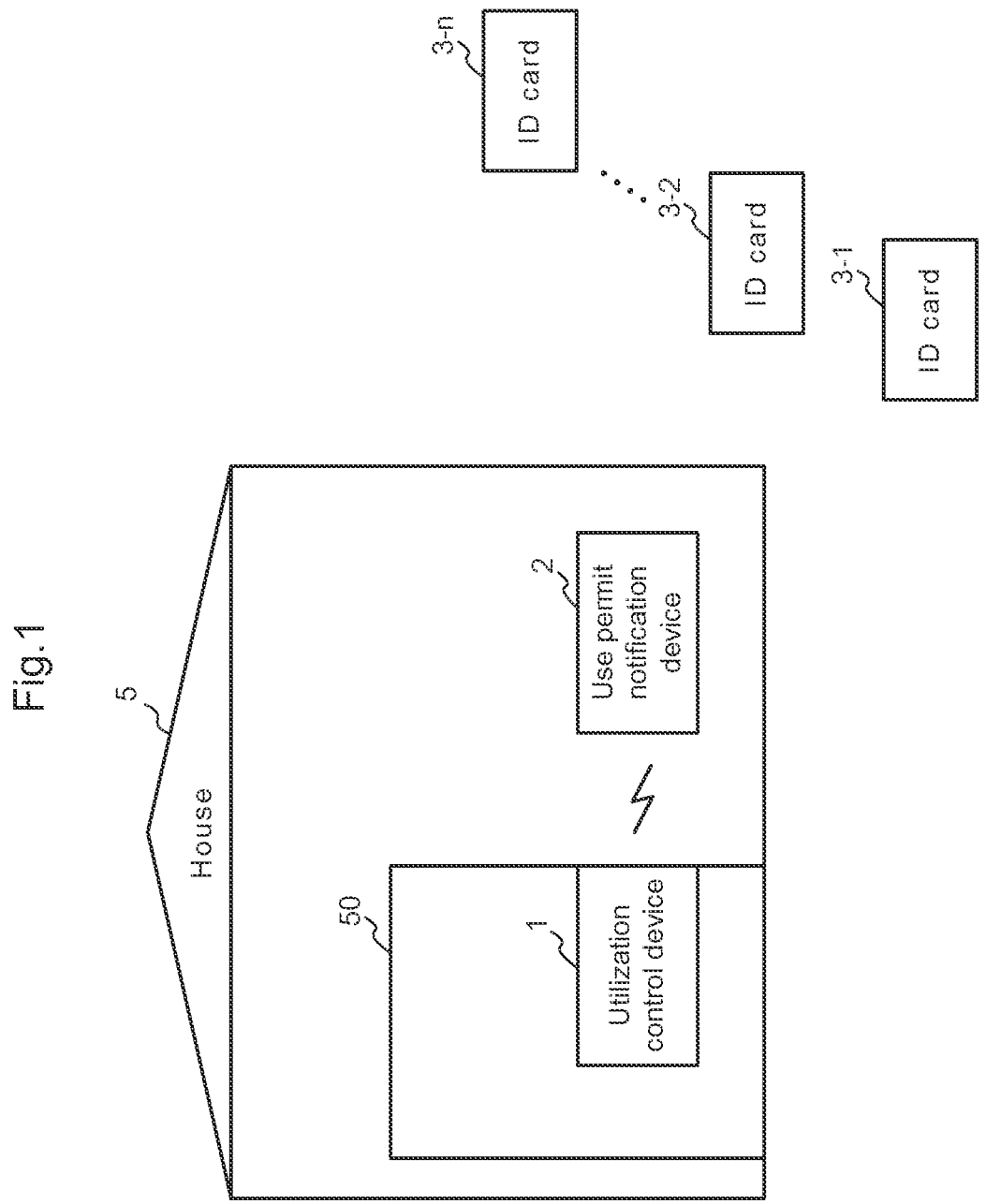
FIG. 1 is a schematic configuration diagram showing a utilization control system according to one embodiment of the present invention.

In the following, one embodiment of the present invention will be described referring to the drawings. In the following, a house 5 will be mentioned as an example of a usage target object.

FIG. 1 is a schematic configuration diagram showing a utilization control system according to the present embodiment.

As shown in the figure, the utilization control system of the present embodiment comprises: a utilization control device 1, which is provided for the house 5 and controls locking/unlocking of an entrance 50 of the house 5, based on a use permit including transaction information specifying usage conditions for using the house 5; a use permit notification device 2, which is placed near the utilization control device 1 of the house 5 and notifies the use permit to the utilization control device 1; and ID cards 3-1 to 3-n, which are lent to multiple users who use the house 5 (hereinafter, also simply referred to as the ID card 3).

The utilization control device 1 can communicate only by using Near Field Communication such as Infrared Data Association (IrDA) or Bluetooth (registered trademark). A hole data including a public key required for signature verification of the use permit and a common key required for decryption of the transaction information have been set in the utilization control device 1.

In the use permit notification device 2, the use permit and a signature are registered for each user ID (password etc.) stored in ID card 3. The signature is generated using a private key paired with the public key included in the hole data set in the utilization control device 1. In particular, the use permit, a predetermined part of the use permit, or a message digest thereof is encrypted with the private key, and the encrypted information is used as the signature. The transaction information is encrypted the common key included in the hole data. The use permit notification device 2 reads the ID form the ID card 3 carried by the user according to operation of the user, and sends the use permit and the signature that are stored in association with the read ID to the utilization control device 1 via the Near Field Communication.

Figure 2:
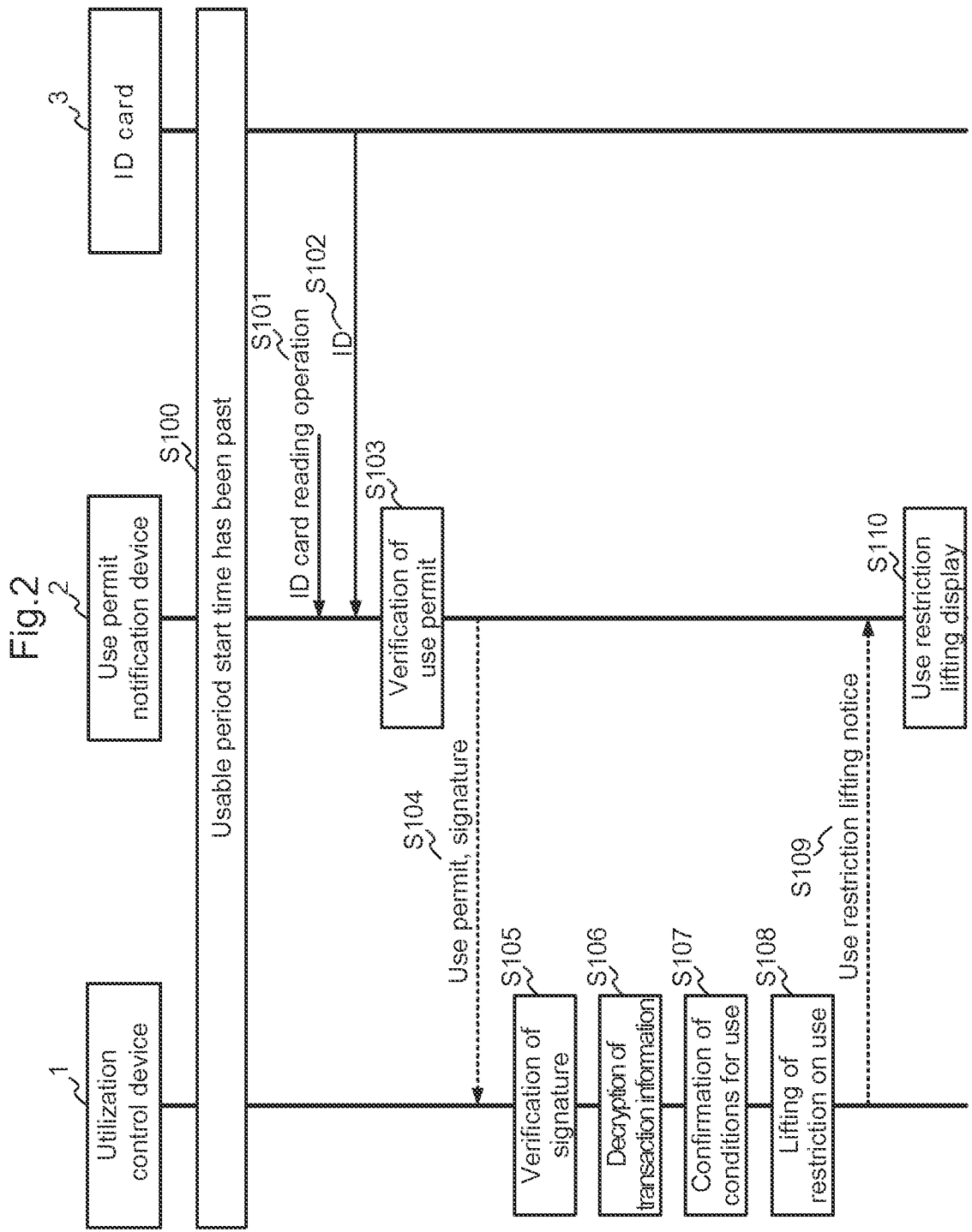
FIG. 2 is a sequence diagram showing an operation example of the utilization control system according to the one embodiment of the present invention.

FIG. 2 is a sequence diagram showing an operation example of the utilization control system according to the present embodiment. Here, the transaction information included in the use permit includes usable period start and end time of the house 5 as the usage conditions for using the house 5.

As to the use permit stored in the use permit notification device 2 in association with a certain user (referred to as user A) who carries the ID card 3, it is assumed that the usable period start time included in the transaction information of the use permit has been past (S100).

In the case that the present date is within the period specified by the usable period start and end time included in the transaction information, when the user A approaches the use permit notification device 2 and performs an ID card reading operation for causing the use permit notification device 2 to read the ID card 3 carried by the user A (S101), the use permit notification device 2 reads the ID of the user A from the ID card 3 (S102), and searches for the use permit and the signature in association with this ID (S103). Then, the use permit notification device 2 sends the use permit and the signature in association with the ID of the user A to utilization control device 1 via the Near Field Communication (S104).

Receiving this, the utilization control device 1 verifies the signature received together with the use permit from the use permit notification device 2 via the Near Field Communication, by using the public key included in the hole data set in the utilization control device 1 itself (S105). When the signature verification is established, the utilization control device 1 decrypts the transaction information that is encrypted (hereinafter, referred to as the encrypted transaction information) included in the use permit by using the common key included in the hole data (S106).

Next, the utilization control device 1 confirms satisfaction of the usage conditions specified by the decrypted transaction information (S107). In detail, the utilization control device 1 confirms that the present date is within the period specified by the usable period start and end times. Then, when it is confirmed that the usage conditions are satisfied, the utilization control device 1 lifts the restriction on use of the house 5 (S108). For example, the utilization control device 1 unlocks the auto-locking device at the entrance 50 of the house 5, or automatically opens the door of the entrance 50, or the like.

Thereafter, the utilization control device 1 sends a use restriction lifting notice to the use permit notification device 2 via the Near Field Communication (S109). In response to this, the use permit notification device 2 performs a predetermined use restriction lifting display such as displaying or audio outputting a message that the entrance 50 of the house 5 has been unlocked, or the like (S110).

Next, details of the utilization control device 1 and the use permit notification device 2 as components of the utilization control system according to the present embodiment will be described. On the other hand, description of details of the ID card 3 will be omitted since existing storage media such as an IC card, a magnetic card, or a wireless tag can be used for the ID card 3.

First, details of the utilization control device 1 will be described.

Figure 3:
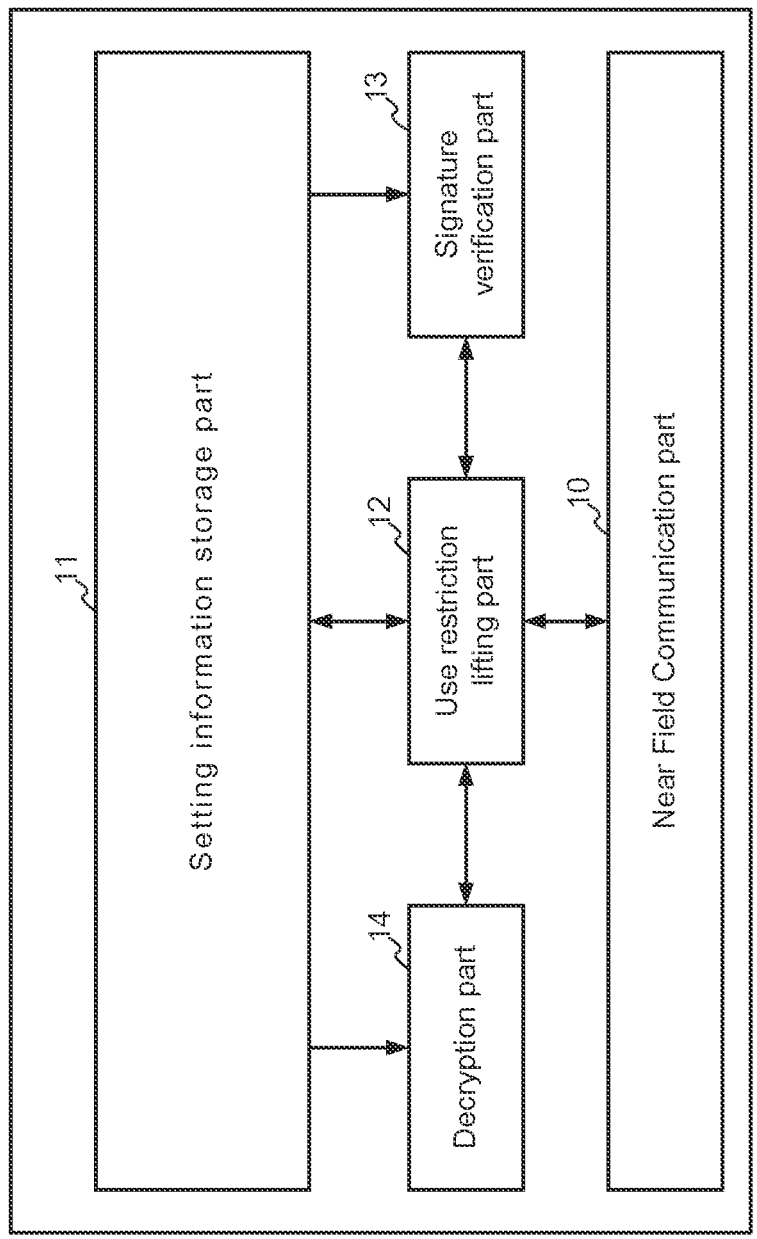
FIG. 3 is a schematic functional configuration diagram of a utilization control device 1.

FIG. 3 is a schematic functional configuration diagram of the utilization control device 1.

As shown in the figure, the utilization control device 1 comprises a Near Field Communication part 10, a setting information storage part 11, a use restriction lifting part 12, a signature verification part 13, and a decryption part 14.

The Near Field Communication part 10 communicates with the use permit notification device 2 via the Near Field Communication such as an IrDA or Bluetooth (registered trademark).

The setting information storage part 11 stores setting information including the hole data. As described above, the hole data includes the public key for verification of the signature on the use permit and the common key for decryption of the encrypted transaction information included in the use permit.

The use restriction lifting part 12 lifts the restriction on use of the house 5, when verification of the signature received together with the use permit from the use permit notification device 2 is established and the usage conditions specified by the transaction information included in the use permit are satisfied. For example, the use restriction lifting part 12 outputs an unlocking instruction to the auto lock device of the entrance 50 of the house 5.

The signature verification part 13 verifies the signature on the use permit by using the public key included in the hole data stored in the setting information storage part 11.

The decryption part 14 decrypts the encrypted transaction information included in the use permit by using the common key included in the hole data stored in the setting information storage part 11.

Here, the schematic functional configuration of the utilization control device 1 shown in FIG. 3 may be implemented by hardware, for example by an integrated logic IC such as an Application Specific Integrated Circuit (ASIC) or a Field Programmable Gate Array (FPGA), or may be implemented by software on a computer device such as a Digital Signal Processor (DSP). Or, in a general-purpose computer comprising a CPU, a memory, an auxiliary storage such as a flash memory or a hard disk drive, and a Near Field Communication device such as an IrDA communication device or a Bluetooth (registered trademark) communication device, the schematic functional configuration may be implemented by the CPU loading a prescribed program into the memory from the auxiliary storage and executes the program.

FIG. 4 is a flowchart for explaining operation of the utilization control device 1.

This flow is started when the Near Field Communication part 10 receives the use permit together with the signature from the use permit notification device 2 via the Near Field Communication.

The use restriction lifting part 12 delivers the use permit and the signature received from the use permit notification device 2 to the signature verification part 13 via the Near Field Communication part 10, and instructs verification of the signature to the signature verification part 13. Receiving to this, the signature verification part 13 verifies the signature on the use permit by using the public key included in the hole data stored in the setting information storage part 11 (S200). In detail, the signature verification part 13 verifies the validity of the signature by using the public key to decrypt the signature and by judging whether the decrypted information is in accordance with the use permit, a predetermined part of the use permit, or their message digest.

Next, the signature verification part 13 notifies the use restriction lifting part 12 of the verification result of the signature. Receiving this, when the verification of the signature is established to validate the signature (YES in S201), the use restriction lifting part 12 delivers the encrypted transaction information included in the use permit to the decryption part 14 and instructs decryption of the encrypted transaction information to the decryption part 14. On the other hand, when the verification of the signature fails to validate the signature (NO in S201), the use restriction lifting part 12 sends an error message to the use permit notification device 2 via the Near Field Communication part 10 (S206).

Next, when the decryption part 14 receives the encrypted transaction information together with the instruction of the decryption from the use restriction lifting part 12, the decryption part 14 decrypts the encrypted transaction information by using the common key included in the hole data that is stored in the setting information storage part 11 (S202). Then, the decryption part 14 delivers the decrypted transaction information to the use restriction lifting part 12.

Receiving to this, the use restriction lifting part determines satisfaction of the usage conditions specified by the decrypted transaction information (S203). In detail, the use restriction lifting part 12 determines whether the present date is within the period specified by the usable period start and end times included in the transaction information.

Next, when the use restriction lifting part 12 determines that the usage conditions specified by the transaction information are satisfied (YES in S203), the use restriction lifting part 12 lifts the restriction on use of the house 5 (S204). For example, the use restriction lifting part 12 outputs an unlocking instruction to the auto lock device of the entrance 50 of the house 5. Then, the use restriction lifting part 12 sends the use restriction lifting notice to the use permit notification device 2 via the Near Field Communication part 10 (S205).

On the other hand, when the use restriction lifting part 12 determines that the usage conditions specified by the transaction information are not satisfied (NO in S203), the use restriction lifting part 12 sends an error notification to the use permit notification device 2 via the Near Field Communication part 10 (S206).

Next, details of the use permit notification device 2 will be described.

FIG. 5 is a schematic functional configuration diagram of the use permit notification device 2.

As shown in the figure, the use permit notification device 2 comprises a Near Field Communication part 20, a card reader part 21, a use permit storage part 22, a display part 23 such as liquid crystal display, a use permit searching part 24, a use permit sending part 25, and a notification receiving part 26.

The Near Field Communication part 20 communicates with the utilization control device 1 via the Near Field Communication such as an IrDA or Bluetooth (registered trademark).

The card reader part 21 reads the ID from the ID card 3 carried by the user according to ID card reading operation of the user.

In the use permit storage part 22, for each user, the use permit is stored in association with the ID of the user together with the signature on this use permit. As described above, the signature is generated using the private key paired with the public key included in the hole data set in the utilization control device 1. Further, the use permit includes the transaction information specifying the usage conditions (the usable period start and end time, etc.) of the house 5, and the transaction information is encrypted by the common key included in the hole data set in the utilization control device 1.

The use permit and the signature are stored in the use permit storage part 22 from a terminal such as an administrator of the house 5, via the Near Field Communication part 20 or a network interface such as a Network Interface Card (NIC) or wireless LAN adapter that are not shown.

The use permit searching part 24 searches, from the use permit storage part 22, for the use permit and the signature in association with the ID read by the card reader part 21.

The use permit sending part 25 sends the use permit and the signature searched by the use permit searching part 24 to the utilization control device 1 via the Near Field Communication part 20.

The notification receiving part 26 receives various notifications from the utilization control device 1 via the Near Field Communication part 20 to display the received notifications to the display part 23.

Here, similar to the utilization control device 1, the schematic functional configuration of the use permit notification device 2 shown in FIG. 5 may be implemented by hardware, for example by an integrated logic ID such as an ASIC, an FPGA, or by software on a computer device such as a DSP. Or, in a general-purpose computer comprising a CPU, a memory, an auxiliary storage such as a flash memory or a hard disk drive, and a Near Field Communication device such as a IrDA communication device or Bluetooth (registered trademark) communication device, the schematic functional configuration may be implemented by the CPU loading a prescribed program into the memory from the auxiliary storage and executes the program.

FIG. 6 is a flowchart for explaining operation of the use permit notification device 2.

This flow is started when the card reader part 21 receives ID card reading operation from the user.

The card reader part 21 reads the ID from the ID card 3 carried by the user who has been performed the ID card reading operation (S210). Then the card reader part 21 delivers the read ID to the use permit searching part 24. Receiving to this, the use permit searching part 24 refers to the use permit storage part 22 and searches for the use permit and the signature in association with the ID received from the card reader part 21 (S211). Here, if the use permit and the signature in association with the ID received from the card reader part 21 are not stored in the use permit storage part 22 and the use permit searching part 24 fails to search (NO in S212), the use permit searching part 24 performs predetermined error processing such as displaying an error message on the display part (S215).

On the other hand, if the use permit and the signature in association with the ID received from the card reader part 21 are stored in the use permit storage part 22 and the use permit searching part 24 succeeds to search (YES in S212), the use permit searching part 24 delivers the use permit and the signature that are searched to the use permit sending part 25. Receiving to this, the use permit sending part 25 sends the use permit and the signature that are received from the use permit searching part 24 to the utilization control device 1 via the Near Field Communication (S213). After that, the notification receiving part 26 receives a notification (either a use restriction lifting notice or an error notice) from the utilization control device 1 via the Near Field Communication and displays it on the display unit 23 (S214).

Hereinabove, one embodiment of the present invention has been described.

In the present embodiment, the utilization control device 1 can communicate only via the Near Field Communication, and is separated from a network. Accordingly, the utilization control device 1 is not attacked from the outside via a network such as the Internet. Further, the user permit used for lifting the restriction on use of the house 5 is validated by verifying the signature added to the use permit, by using the public key included in the hole data. Thus, according to the present embodiment, it is possible to reduce security risk.

Further, in the present embodiment, the utilization control device 1 lifts the restriction on use of the house 5 by such as unlocking the entrance 50 of the house 5 only when the usage conditions specified by the transaction information included in the use permit are satisfied, and otherwise the utilization control device 1 does not lift the restriction on use of the house 5 by such as not unlocking the entrance 50 of the house 5. Accordingly, the use permit that does not satisfy the usage conditions becomes invalid even though it has been authenticated. As a result, it is not necessary for the user to return the use permit. Further, an administrator or the like who manages the house 5 registers the use permit of the user in the use permit notification device 2 in association with the ID of the user in advance. By the user makes the use permit notification device 2 to read own ID, the user can use the house 5 under the usage conditions specified by the transaction information included in the use permit. Accordingly, in the case that multiple users use the house 5, each user can freely use the house 5, under the usage conditions specified by the transaction information included in own use permit. It is not necessary for selecting a representative among the multiple users to entrust with the management of the room key or the like and the unlocking/locking of the facility. Thus, according to the present embodiment, convenience is improved.

Thus, according to the present embodiment, it is possible to improve convenience while reducing security risks in use management such as unlocking control of the house 5.

The present invention is not limited to the above embodiment, and can be changed variously within the scope of the invention.

For example, in the above embodiment, identification information such as password included in the ID cards 3 that are lent to the users or the like are used as the ID of the users. The present invention, however, is not limited to this. Identification information stored in medium other than the ID cards carried by the users may be used as the ID of the users. Or, biometric authentication information such as fingerprints, veins, or an irises of the users may be used as the ID of the users. In this case, in the use permit notification device 2 in FIG. 5, instead of the card reader part 21, it is installed a biometric reader part, which reads biometric authentication information from the users according to instructions of the users.

Further, the above embodiment has been described by taking an example where the usable period start and end times is used as the usage conditions specified by the transaction information. The present invention, however, is not limited to this. It is sufficient that the usage conditions can specify the conditions for lifting the restriction on use of the house 5. For example, instead of the usable period start and end times, or, addition to the usable period start and end times, number of times of use may be used as the usage conditions. In this case, in S213 of FIG. 6, the use permit notification device 2 sends the ID read from the ID card 3 in S210 of FIG. 6 to the utilization control device 1 together with the use permit and the signature. On the other hand, in the setting information storage part 11 of the utilization control device 1, for each user, number of times of use of the house 5 (the number of times of unlocking the entrance 50) is stored in connection with the ID of the user. And, in S203 of FIG. 4, the use restriction lifting part 12 determines that the usage conditions are sufficient when the number of times of use specified by the transaction information included in the use permit received from the use permit notification device 2 is equal to or more than the number of times of use sored in the setting information storage part 11 in connection with the ID received from the use permit notification device 2 together with this use permit. Further, in S204 of FIG. 4, when the restriction on use of the house 5 is lifted, the number of times of use, which is sored in the setting information storage part 11 in connection with the ID received from the use permit notification device 2 together with this use permit, is incremented by one.

Further, in the above embodiment, the transaction information included in the use permit is encrypted by using the common key included in the hole data set in the utilization control device 1, and the utilization control device 1 decrypts the encrypted transaction information included in the use permit received from the use permit notification device 2. The present invention, however, is not limited to this. Without being encrypted, a plain text of the transaction information may be included in the use permit. In this case, the common key may be omitted from the hole data set in the utilization control device 1.

Further, the above embodiment has been described by taking an example where the utilization control device 1 is used for unlocking control of the auto lock device installed at the entrance 50 of the house 5. The present invention, however, is not limited to this. It is possible that the usage target object is a hotel, an inn, a guesthouse, a warehouse, a room, or the like, and the utilization control device 1 is used for unlocking control of an auto lock device installed at an entrance of such the usage target object. Or, it is possible that the usage target object is a moving body such as an automobile or a bicycle, and the utilization control device 1 is used for unlocking of a door of the moving body or for turning on an ignition. Or, it is possible that the usage target object is a browsing terminal for an electronic medium of, for example, an electronic medical record, an electronic book, or the like, and the utilization control device 1 is used for lifting restriction on access to the electronic medium or for decrypting the encrypted electronic medium.

REFERENCE SIGNS LIST

1: utilization control device; 2: management device; 3, 3-1 to 3-$n$: ID card; 5:house; 10: Near Field Communication part; 11: setting information storage part; 12: use restriction lifting part; 13: signature verification part; 14: decryption part; 20: Near Field Communication; 21: card reader part; 22: use permit storage part; 23: display part; 24: use permit searching part; 25: use permit sending part; 26: notification receiving part; 50: entrance

The invention claimed is:

1. A utilization control system that controls use of a usage target object, comprising:
   a utilization control device that controls use of the usage target object by locking/unlocking, access control, or encrypting/decrypting, based on a use permit including transaction information specifying usage conditions for using the usage target object; and
   a use permit notification device that notifies the use permit to the utilization control device, wherein,
   the use permit notification device comprises:
   a use permit storage means that stores the use permit together with a signature on the use permit generated by using a predetermined private key, for each user identification information;
   an identification information obtaining means that obtains the user identification information; and
   a use permit sending means that sends the use permit and the signature that are stored in the use permit storage means in association with the user identification information obtained by the identification information obtaining means, to the utilization control device via Near Field Communication,
   the utilization control device can communicate only via the Near Field Communication, and comprises:
   a hole data storage means that stores a hole data that includes a public key paired with the predetermined private key and is necessary for verification of the use permit;
   a transaction information obtaining means that verifies the signature received together with the use permit from the use permit notification device by using the public key included in the hole data stored in the hole data storage means to obtain the transaction information included in the use permit when the verification being established; and
   a lifting means that lifts restriction on use of the usage target object with referring to the transaction information obtained by the transaction information obtaining means when the usage conditions specified by the transaction information being satisfied.

2. The utilization control system according to claim 1, wherein
   the hole data includes a common key,
   the transaction information included in the use permit is encrypted by using the common key, and
   in utilization control device, the transaction information obtaining means decrypts the encrypted transaction information included in the use permit by using the common key included in the hole data stored in the hole data storage means.

3. The utilization control system according to claim 1, wherein the identification information obtaining means reads a password of a user stored in a storage media as the user identification information.

4. The utilization control system according to claim 1, wherein the identification information obtaining means reads a biometric authentication information from a user as the user identification information.

5. A utilization control method for controlling use of a usage target object by using: a utilization control device that controls use of the usage target object by locking/unlocking, access control or encrypting/decrypting based on a use permit; and a use permit notification device that notifies the use permit to the utilization control device, wherein,
   the use permit notification device:
   stores the use permit that includes transaction information specifying usage conditions for using the usage target object, together with a signature on the use permit generated by using a predetermined private key, for each user identification information; and
   on obtaining to user identification information, sends the use permit and the signature stored in connection with the user identification information to the utilization control device,
   the utilization control device:
   can communicate only via the Near Field Communication;
   stores a hole data that includes a public key paired with the predetermined private key and is necessary for verification of the use permit; and
   verifies the signature received together with the use permit from the use permit notification device by using the public key included in the hole data to refer to the transaction information included in the use permit when the verification being established, and lifts restriction on use of the usage target object if the conditions specified by the transaction information are satisfied.

6. The utilization control system according to claim 2, wherein the identification information obtaining means reads a password of a user stored in a storage media as the user identification information.

7. The utilization control system according to claim 2, wherein the identification information obtaining means reads a biometric authentication information from a user as the user identification information.

\* \* \* \* \*